United States Patent [19]

Eaton

[11] 4,225,152
[45] Sep. 30, 1980

[54] TRAILER SUSPENSIONS

[76] Inventor: Peter R. K. Eaton, 11 Main North Rd., Clare, Australia

[21] Appl. No.: 892,019

[22] Filed: Mar. 31, 1978

[51] Int. Cl.² .................................................. B60G 11/04
[52] U.S. Cl. ........................................................... 280/718
[58] Field of Search ............... 280/718, 720, 688, 689, 280/669; 267/66, 67, 52, 36 R

[56] References Cited

U.S. PATENT DOCUMENTS

| 4,098,523 | 7/1978 | Valerio | 280/718 |
| 4,103,932 | 8/1978 | Parker | 280/718 |

Primary Examiner—Richard A. Bertsch
Attorney, Agent, or Firm—Norbert P. Holler; Philip Rodman

[57] ABSTRACT

An improved leaf spring suspension system for a trailer, which incorporates a pair of even acting fluid dampers one on each side of the trailer chassis, each damper being connected at its ends to and extending between extension arms depending from the corresponding leaf spring rear end suspension point and a mounting bracket secured to the underside of the chassis, the dampers being arranged to slope upwards in a rearward direction.

8 Claims, 3 Drawing Figures

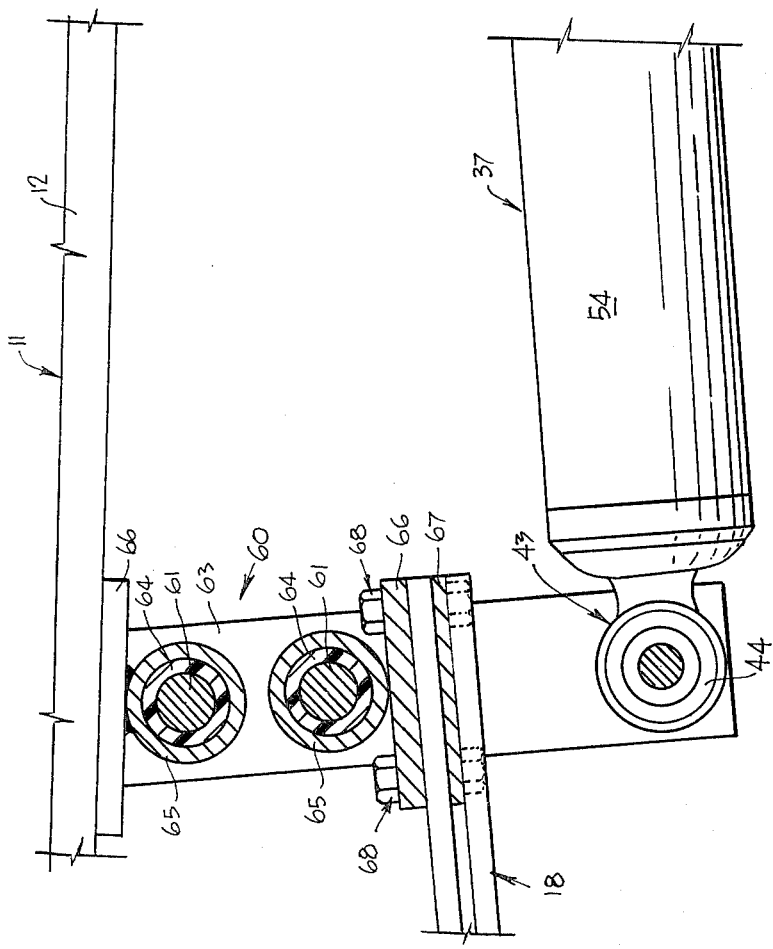

TRAILER SUSPENSIONS

This invention relates to improvements in suspension means suitable for suspension of vehicles, and in particular improvements in a trailer suspension of the beam axle type.

BACKGROUND OF THE INVENTION

Most trailer or caravan suspensions incorporate leaf springs, the usual leaf spring arrangement utilising a beam axle extending between two ground-engaging wheels, the beam axle being bolted to the centre of each of the two leaf springs, each leaf spring being normally mounted to the trailer or caravan chassis at one end by means of a fixed bracket and at the other end to a shackle. The fixed bracket provides an anchor point whilst the shackle allows the spring to lengthen or shorten according to the loads applied.

Whilst this type of beam axle suspension has proved satisfactory, there are a number of problems associated with it during use. One of these arises when a large degree of spring deflection takes place, this causing the centre of the spring to move in a longitudinal direction with respect to the direction of travel. Whilst in many instances this is not of great importance, provided the two springs are deflected simultaneously by approximately the same amount, sometimes, however, one spring is deflected more than the other, particularly when the springs are unevenly loaded, and the combined effect of flattening the spring and pivoting it about its mounting at one end causes only that wheel supported by that spring to move in a longitudinal direction with respect to the trailer, thus causing the axle to slew, the end result being that the trailer is caused to move in a direction which deviates from its previous straight line movement. Another commonly encountered problem with beam axle suspensions is that caused by the deflection of the springs during body roll of a caravan for example (under the influence of lateral forces), this resulting in a spring wind-up situation. This of course can cause the trailing vehicle to swerve dangerously and in turn cause the towing vehicle to "snake" or sway.

Furthermore, conventional beam-axle suspension systems undergo undesirable ride characteristics under the influence of varying loads, this mainly being due to the fact that the rate of a conventional suspension leaf spring is substantially constant regardless of the load or forces applied during use.

One attempt to overcome some of the above problems and which is known to the Applicant, utilises a pair of conventional shock absorbers, one on each side of the chassis, and each mounted having one end connected to and medially of the length of its corresponding spring and its other end to the underside of the chassis, and in an approximate vertical disposition. This arrangement has not proven to be satisfactory.

One of the main objects of this invention therefore is to provide an improved trailer suspension system which will greatly improve the ride and handling of the trailer during towing.

It is a further object of this invention to provide an improved trailer suspension which is of simple design, of low cost and which can be readily adapted to conventional leaf spring suspension systems.

SUMMARY OF THE INVENTION

In one of its forms, this invention is directed to an improved trailer suspension system of the type having a trailer chassis suspended for movement relative to its wheels by a pair of leaf springs, one on each side of the chassis and each having its rear end connected to the underside of the chassis by a shackle, the improvement comprising, a pair of identical even acting fluid dampers each comprising a piston cylinder combination, each said damper being operatively connected at its ends to and extending between first mounting means secured to and depending from a respective said spring rear end shackle and second mounting means spaced rearwardly of said first mounting means and secured to the chassis, said dampers being arranged to slope upwardly in a rearwards direction. For the purpose of this specification, the term "even acting" refers to a fluid damper having a piston assembly whose rate of extension is equal to its rate of retraction.

It is preferred that positive-feed hydraulic dampers be used, however gas-filled dampers (shock absorbers) may also be suitable. Most suitable for use with the present invention are heavy rating hydraulic dampers and it has been found that a damper having a rating of 512 lbs. per 100 cycles/minute in each direction is ideal. It will of course be appreciated that the rating of the damper varies during use, and may for example vary from 200 lbs per 30 cycles/minute over slightly uneven ground to 512 lbs per 100 cycles/minute over ground which has sharp drops or ridges.

Each damper in the case of hydraulic dampers, is arranged to have its cylinder end pivotally connected to its corresponding shackle mounting means and its piston rod outer end to the mounting means on the chassis to allow positive oil feed to the piston assembly inside the hydraulic cylinder.

With this invention, the unit can be readily fitted to a trailer or caravan having a conventional leaf spring suspension. The suspension stabilizer dampers when connected in the manner hereinbefore described, have shown from practical tests to;

(i) improve the ride of the towed vehicle by smoothing out the "bumps" normally transmitted through the springs to the vehicle chassis frame, (ii) reduce body roll which in the case of a caravan body is of much importance, (iii) control axle tramp by slowing down or dampening the back and forth (rectilinear) movement of the axle, and (iv) control axle slew and thereby control the steering movement of the whole suspension.

It is considered that the aforementioned practical improvements are brought about by a combination of effects. Firstly, the dampers by being coupled directly to the leaf spring rear end suspension point provides, during operation, a spring of variable stiffness, the stiffness of the spring varying as a consequence of the change in rating of the corresponding damper. Secondly, the manner in which the connection to the shackle is made affords a mechanical advantage which means that the full effect of upward or downward forces exerted on the axle are prevented from being transmitted to the chassis. The larger the leverage (for a given damper), the less is the load applied to the chassis. Thirdly, the dampers, during operation, under the influence of lateral forces, provide a controlling moment (couple) approximately the full width of the chassis thereby giving a restraining movement against any twist or tilt of the body. The body movement is thus stabilised to some degree.

DETAILED DESCRIPTION OF THE INVENTION

Figure 1:
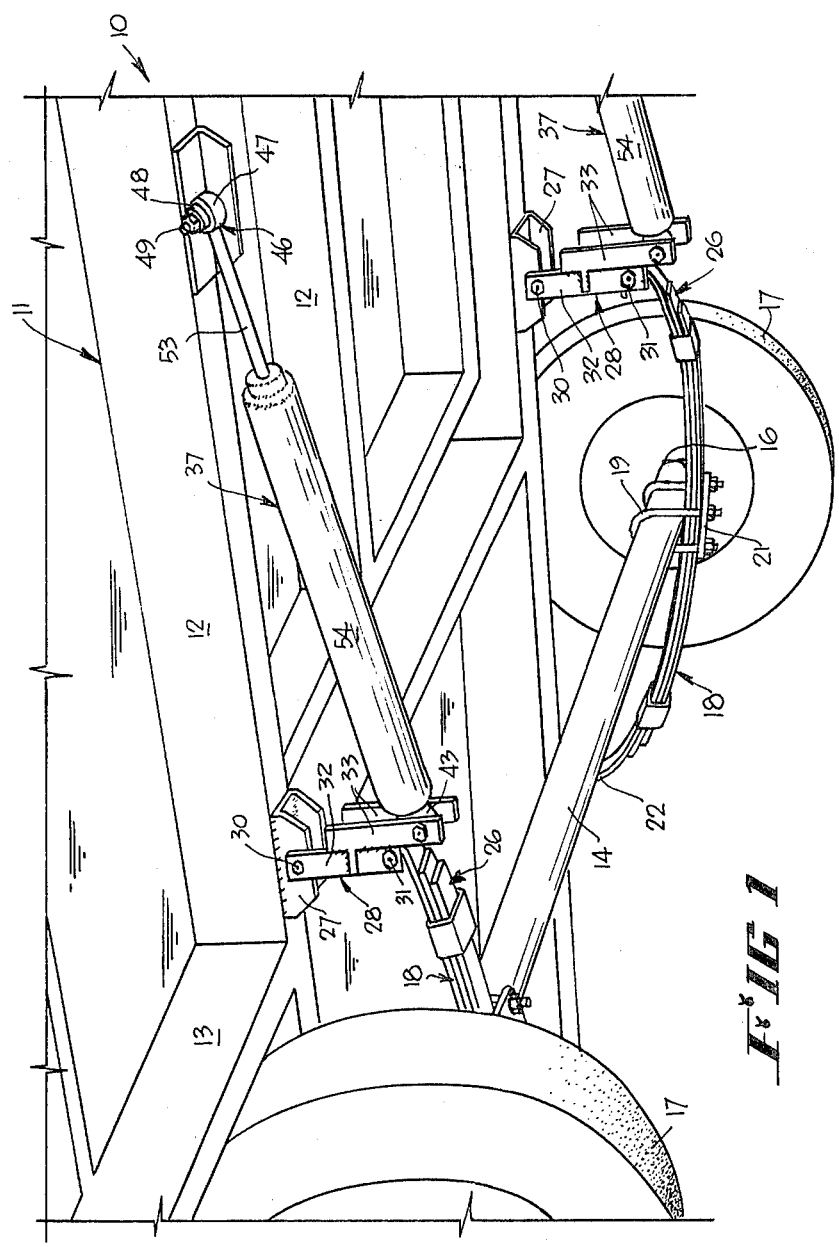
Figure 2:
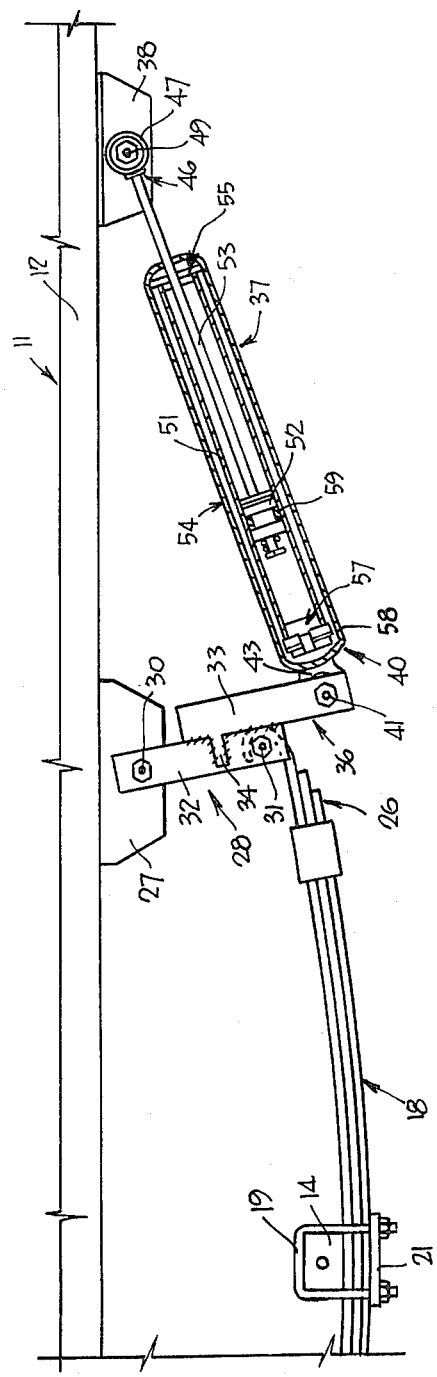

Two embodiments of the invention are described hereunder in some further detail with reference to and illustrated in the accompanying drawings in which:

FIG. 1 is an underside perspective view of the improved suspension system according to one embodiment of the invention, FIG. 2 is a side elevation (partly sectioned) of the system of FIG. 1, and FIG. 3 is a side elevation of a suspension system according to a second embodiment.

In the embodiment of FIGS. 1 and 2, a caravan trailer 10 is provided with a chassis 11 having longitudinal chassis frame members 12 and chassis frame transverse members 13. A transversely extending beam axle 14 is centrally disposed beneath the underframe of the chassis 11, the axle 14 having at its ends wheel hubs 16 mounted on bearings (not shown) Each end of the beam axle 14 has a pneumatic tyre ground engaging wheel 17 carried on its corresponding hub 16.

At each side of the trailer chassis 11, an elongated leaf spring 18 comprising a plurality of leaves is bolted at its midpoint to the transversely extending beam axle 14 by means of U bolts 19 which pass through a clamping plate 21 located on the underneath surface of the lowermost spring leaf. The forward end 22 of each spring 18 is mounted to the underside of a longitudinal chassis frame member 12 by means of a U-shaped bracket (not shown) welded to the chassis member 12 and a transverse bolt passing through the bracket and the spring forward end 22. The rear end portion 26 of each leaf spring 18 is pivotally mounted to the trailer chassis 11 by means of a U-shaped bracket 27 welded to the underside of the chassis 11 and a shackle 28 which allows the leaf spring 18 to lengthen or shorten according to load variation. Each shackle 28 comprises upper and lower shackle pivot bolts 30, 31 respectively and shackle links or arms 32 pivoted at their ends to the bolts 30,31, lower pivot bolts 31 connecting the rear ends of the springs to the shackle links 32. The foregoing construction is conventional.

Each shackle 28 is provided with a pair of spaced parallel planar extension arms 33 which flank the shackle one on each side thereof. In this embodiment, the extension arms 33 are positioned along the rear vertical edges of corresponding shackle links 32 and are seam welded together along the contiguous edges thereof. Each arm 33 has a connection piece 34 which engages against the outer face of the corresponding link 32 and is seam welded thereto, whereby the arm is firmly secured in position. In this embodiment, each arm 33 and its corresponding link 32 lie in the same vertical plane, the arm projecting beyond the lower edge of the link to form an extension portion 36.

A pair of identical heavy rating positive feed even-acting hydraulic dampers 37 are connected to and extend between respective shackle extension arms 32 and respective rearward mounting brackets 38 welded to the underside of respective chassis frame members 12. Each damper 37 has its cylinder end 40 located between a pair of shackle extension arms 33 and is pivoted thereto by means of a transverse pivot pin 41 which passes through aligned apertures formed in the extension portions 36 and an apertured lug 43 welded to the cylinder end and in which is fitted a rubber bush 44.

Each damper 37 has its piston rod outer end 46 connected to a corresponding mounting bracket 38 which is of angle-cross section, the piston rod outer end having an eye ring 47 in which is fitted a rubber bush 48. Each bracket 38 has a transverse pivot bolt 49 projecting from the vertical flange of the bracket 38, the piston rod end being pivoted to the transverse bolt 49 by means of the eye ring 47. It will of course be appreciated that the positioning of the angle section brackets 38 on the chassis underframe 11 is determined by and dependent upon the extent of piston movement required by the dampers. The dampers, when fitted have a normal position wherein the pistons are located intermediate the length of the respective cylinders, the length of the piston rod projecting from the cylinder being, in this embodiment, approximately 5½ inches. Once this has been ascertained, the brackets 38 are then welded to the chassis 11 and the dampers 37 are then placed on their respective pivot pins and nuts 50 replaced and tightened.

By having the dampers 37 connected at their cylinder ends to respective pairs of extension arms depending from the shackles, this arrangement gives a mechanical advantage, whereby more effective stroke movement of the dampers are obtained. It has been found in field tests that the shackle links and their associated extension arms move in an arc of approximately three inches in length.

Each positive feed damper 37 is of known construction and comprises a cylinder 51, a piston assembly 52 slidably mounted within the cylinder, a piston rod 53 carried by the piston assembly projecting from one end of the cylinder 51 and terminating in the eye ring 47, the cylinder 51 itself being housed within a reservoir tube 54. The end of the cylinder 51 adjacent the piston rod eye ring 47 houses a multi-lip seal 55, the other cylinder end being provided with a three-stage compression valve 57 which is operably associated with a positive feed aperture 58 formed at the base of the cylinder to allow passage of hydraulic fluid therethrough. The piston 52 has a wear resistant piston ring 59 located in a circumferential groove to thereby improve performance.

In the second embodiment illustrated in FIG. 3, the location and arrangement of the dampers 37 is identical; however, the shackle mountings which couple the respective cylinder ends of the dampers to the rear end portions of the leaf springs are varied. In this embodiment, the shackle mounting 60 comprises a pair of vertically spaced transverse high tensile bolts 61 each of which extends between and is carried by a pair of depending planar arms 63 which are positioned one on each side of the leaf spring 18 at its rear end portion. The pivot bolts 61 are carried in nylon bushes 64 which are themselves housed in metal tubular sleeves 65 welded to respective rectangularly shaped mounting plates 66, 66', one plate 66 being itself welded to the underside of the chassis frame 11, the other plate 66' being supported on the upper main leaf of the spring 18. The rear end portion of the main spring leaf is clamped between the plate 66' and a spacer plate 67 by means of four bolt and nut fastenings 68, one at each corner of each of the plates. The arms 63 flank both sides of the plate 66, upper spring leaf 18, spacer plate 67 and the lower spring leaf. With this arrangement, the lower spring leaf is free to lengthen or shorten in the usual manner. The connection of the cylinder end to the lower end of the arm 63 is identical to that described in the first embodiment. It has been found that this arrangement is particularly suitable for converting a slipper spring suspension to one which incorporates the features of the present invention.

It has been shown that this invention greatly improves the ride and handling characteristics of the trailer during towing and improves the tracking especially when travelling over uneven roads. For example, when a wheel drops into a pothole, the spring naturally allows the leaf spring suspension to also drop. The damper which is connected to the shackle end slows down or dampens the spring deflection and thus allows for smoother action. Thus, the beam axle does not move out of alignment as quickly as it would if it was not restricted. At the other side of the beam axle, as soon as one wheel drops into a pothole for example, forces are transmitted through the beam axle to the other leaf spring; however, with the present arrangement the movement of this spring is also dampened and thus the forces transmitted are also absorbed through the hydraulic damper which naturally dampens the rate of deflection of that spring.

Furthermore, it will be realised that the present arrangement greatly assists in minimising problems arising from uneven spring deflection, for example spring wind-up, by restraining body roll, these problems being prevalent in conventional leaf spring suspensions.

Preferably, the hydraulic dampers used have a rating of approximately 512 lbs. per 100 cycles/minute in each direction; however, dampers having a lighter rating may be used.

It should also be appreciated that the present invention can be readily adapted in the case of a tandem trailer wherein there is a pair of beam axle assemblies. In this case, the hydraulic dampers are connected between the rocker arm, which is itself located between a pair of tandem leaf springs, and the underside of the chassis, or the dampers can be connected in the manner described hereinabove.

Further still, the present invention can be readily applied to trailer suspensions of the independent leaf-spring type and hence is not solely limited to beam-axle suspensions.

A brief consideration of the above embodiment will indicate that the invention is extremely simple in construction and of low cost but results in a modified trailer suspension system which is far improved performance-wise in comparison with conventional leaf spring suspension trailers which have not been so modified.

I claim:

1. In an improved vehicle suspension system comprising a vehicle chassis suspended for movement relative to its wheels by a pair of leaf springs, one on each side of the chassis, leaf spring connection means connecting each said leaf spring at one of its ends between movable arms of a shackle which is carried on a shackle pin itself supported by the underside of the vehicle chassis, the improvement comprising;

a pair of identical double-action fluid dampers each comprising a piston cylinder combination, each said damper being operatively connected at its ends to and extending between first pivotal means carried on said arms of a respective said shackle and second pivotal means secured with respect to the chassis and spaced longitudinally from said first pivotal means, each said leaf spring connection means being located between its corresponding said shackle pin and said first pivotal means, said dampers being arranged to slope in an upwards direction away from said first pivotal means.

2. In an improved vehicle suspension system according to claim 1, wherein said fluid dampers are positive feed hydraulic dampers each having its cylinder end pivotally connected to said first pivotal means on a corresponding said shackle and its piston rod outer end pivotally connected to said second pivotal means.

3. In an improved vehicle suspension system according to claim 1, wherein respective ones of said second pivotal means do not overlap corresponding respective said leaf springs.

4. In an improved vehicle suspension system of the type having a vehicle chassis suspended for movement relative to its wheels by a pair of leaf springs, one on each side of the chassis and each having its rear end connected to the underside of the chassis by means of a shackle connection, the improvement comprising a pair of identical double action positive feed hydraulic dampers each comprising a piston/cylinder combination, each said hydraulic damper having its cylinder end pivotally connected to first mounting means secured to and depending from a respective said spring rear end shackle and its piston rod outer end pivotally connected to second mounting means spaced rearwardly of said first mounting means and secured to the underside of said chassis, said dampers being arranged to slope upwardly in a rearwards direction, wherein each said first mounting means comprises a pair of spaced parallel planar arms which form a parallel extension of the corresponding shackle links to which they are secured, and wherein each said cylinder end is pivotally supported by a removable transverse pivot pin carried by and extending between corresponding said extension members, the connection of each damper to the shackle extension arms affording a mechanical advantage.

5. In an improved vehicle suspension system according to claim 4 wherein each said damper has a rating of 512 pounds per 100 cycles/minute.

6. In an improved vehicle suspension system according to claim 4 wherein said piston rod outer end mounting means comprises an angle section bracket welded to the underside of a respective longitudinal chassis frame member.

7. In an improved vehicle suspension according to claim 6 wherein each said damper has its central longitudinal axis lying approximately in the central vertical plane of the corresponding leaf spring, and said dampers are approximately parallel.

8. In an improved vehicle suspension according to claim 4 wherein each said damper has its longitudinal axis at right angles to the extension arms to which that said damper is connected.

* * * * *